United States Patent
Rönneke et al.

(10) Patent No.: US 11,722,568 B2
(45) Date of Patent: Aug. 8, 2023

(54) METHODS PROVIDING DYNAMIC NEF TUNNEL ALLOCATION AND RELATED NETWORK NODES/FUNCTIONS

(71) Applicant: Telefonaktiebolaget LM Ericsson (publ), Stockholm (SE)

(72) Inventors: Hans Bertil Rönneke, Kungsbacka (SE); Qian Chen, Mölndal (SE); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 210 days.

(21) Appl. No.: 17/277,937

(22) PCT Filed: Aug. 5, 2019

(86) PCT No.: PCT/EP2019/071036
§ 371 (c)(1),
(2) Date: Mar. 19, 2021

(87) PCT Pub. No.: WO2020/069785
PCT Pub. Date: Apr. 9, 2020

(65) Prior Publication Data
US 2022/0131941 A1 Apr. 28, 2022

Related U.S. Application Data

(60) Provisional application No. 62/741,179, filed on Oct. 4, 2018.

(51) Int. Cl.
*H04L 67/141* (2022.01)
*H04W 76/10* (2018.01)
*H04L 12/46* (2006.01)

(52) U.S. Cl.
CPC ........ *H04L 67/141* (2013.01); *H04L 12/4633* (2013.01); *H04W 76/10* (2018.02)

(58) Field of Classification Search
CPC . H04L 47/78; H04L 2101/622; H04L 45/306; H04L 45/64; H04L 45/74;
(Continued)

(56) References Cited

U.S. PATENT DOCUMENTS

2018/0192471 A1* 7/2018 Li ........................ H04W 4/60
2018/0219981 A1   8/2018 Backman et al.
(Continued)

FOREIGN PATENT DOCUMENTS

CN        107925631 A      4/2018

OTHER PUBLICATIONS

International Search Report and Written Opinion of the International Searching Authority for PCT International Application No. PCT/EP2019/071036 dated Nov. 21, 2019.
(Continued)

*Primary Examiner* — Matthew C Sams
(74) *Attorney, Agent, or Firm* — Sage Patent Group

(57) ABSTRACT

Methods are provided to operate an SMF node. A request to create a session for a wireless device is received. A communication establishment request is transmitted to an NEF node responsive to receiving the request to create the session for the wireless device, wherein the communication establishment request includes UPF node information for a tunnel between a UPF node and the NEF node to be used for the session for the wireless device. A communication establishment response is received from the NEF node, wherein the communication establishment response includes NEF node information for the tunnel between the UPF node and the NEF node to be used for the session for the wireless device. A tunnel information update is transmitted to the UPF node after receiving the communication establishment response,
(Continued)

wherein the tunnel information update includes the NEF node information for the tunnel between the UPF node and the NEF node.

8 Claims, 16 Drawing Sheets

(58) Field of Classification Search
CPC ....... H04L 61/50; H04L 67/14; H04L 67/147; H04L 67/62; H04W 36/22; H04W 60/04; H04W 76/11; H04W 76/12; H04W 12/06; H04W 12/08; H04W 16/04; H04W 24/04; H04W 28/02; H04W 28/0268; H04W 28/08; H04W 36/0007; H04W 36/12; H04W 36/14; H04W 4/14; H04W 4/50; H04W 4/60; H04W 40/02; H04W 40/24; H04W 40/246; H04W 48/18; H04W 68/00; H04W 72/042; H04W 72/0493; H04W 72/1257; H04W 76/10; H04W 76/20; H04W 76/22; H04W 76/34; H04W 76/40; H04W 8/02; H04W 8/065; H04W 8/14; H04W 8/20; H04W 80/10; H04W 88/18

See application file for complete search history.

(56) References Cited

U.S. PATENT DOCUMENTS

| | | | |
|---|---|---|---|
| 2019/0223250 A1* | 7/2019 | Dao | H04L 67/62 |
| 2019/0313468 A1* | 10/2019 | Talebi Fard | H04W 76/12 |
| 2020/0146077 A1* | 5/2020 | Li | H04W 76/10 |
| 2021/0075865 A1* | 3/2021 | Zhu | H04L 45/64 |
| 2021/0136653 A1* | 5/2021 | Zhang | H04W 40/24 |
| 2021/0176613 A1* | 6/2021 | Purkayastha | H04W 76/12 |
| 2021/0243826 A1* | 8/2021 | Hoffmann | H04W 68/005 |

OTHER PUBLICATIONS

Samsung, "Solution for NIDD," S2-188185, SA WG2 Meeting #128bis, Aug. 20-Jul. 24, 2018, Sophia Antipolis, France, Aug. 24, 2018, 4 pages.

3GPP TR 23.724 V1.0.0, "3rd Generation Partnership Project; Technical Specification Group Services and System Aspects; Study on Cellular IoT support and evolution for the 5G System (Release 16)," Technical Report (Sep. 2018), 234 pages.

3GPP TS 23.502 V15.3.0, "3rd Generation Partnership Project; Technical Specification Group Services and System Aspects; Procedures for the 5G System; Stage 2 (Release 15)," Technical Specification (Sep. 2018), 330 pages.

3GPP TS 23.501 V15.3.0, "3rd Generation Partnership Project; Technical Specification Group Services and System Aspects; System Architecture for the 5G System; Stage 2 (Release 15)," Technical Specification (Sep. 2018), 226 pages.

Decision to Grant dated Jul. 5, 2022 for Japanese Patent Application No. 2021-518135, 4 pages.

Nokia; "TR 23.791: Key Issue on Analytic Information Exposure AF"; SA WG2 Meeting #126; S2-182405; Feb. 26-Mar. 2, 2018; Montreal, Canada; 3 pages.

Samsung; "Solution Update: NIDD Service Activation for AMF and SMF"; SA WG2 Meeting #128, S2-187188; Jul. 2-6, 2018; Vilnius, Lithuania; 15 pages.

Samsung et al.; "Solution 35 Update: Connectivity Between UPF and NEF for NIDD"; SA WG2 Meeting #129 S2-1810336; Oct. 15-19, 2018; Dongguan, China; 9 pages.

* cited by examiner

Roaming 5G system architecture

Small data transfer path

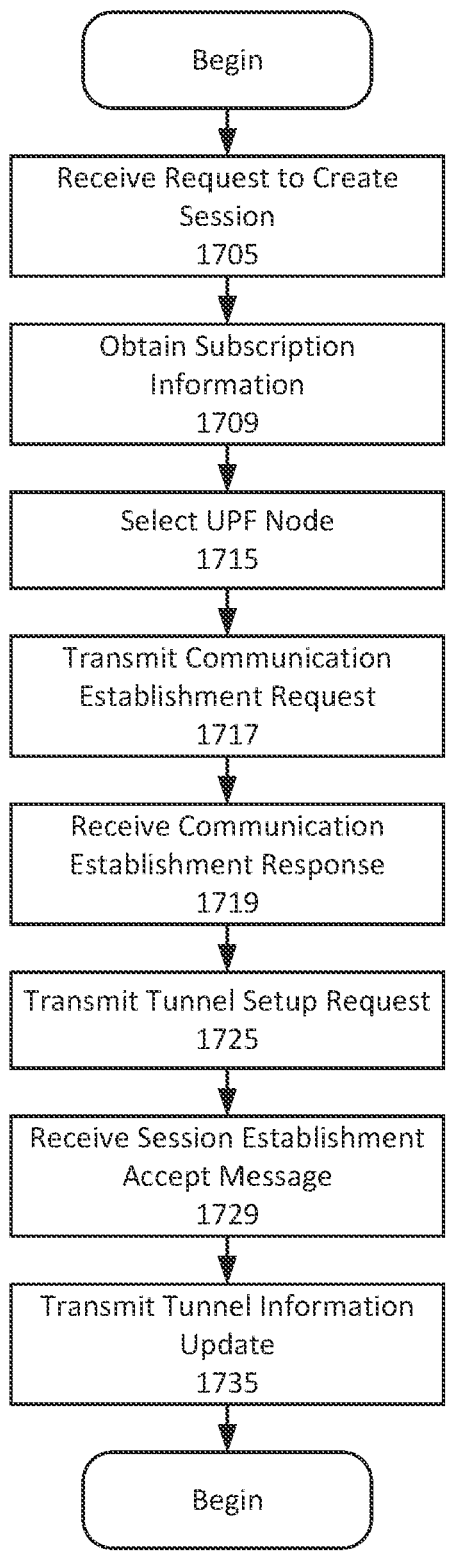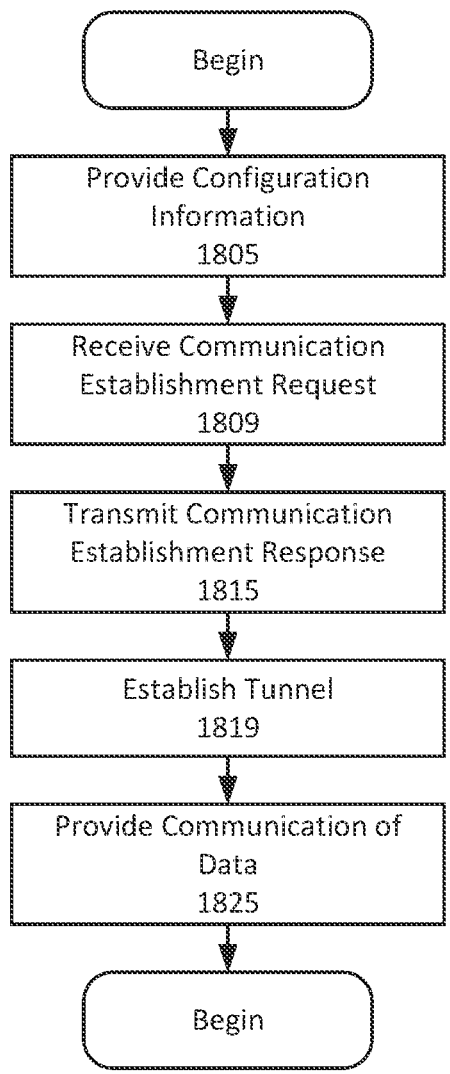

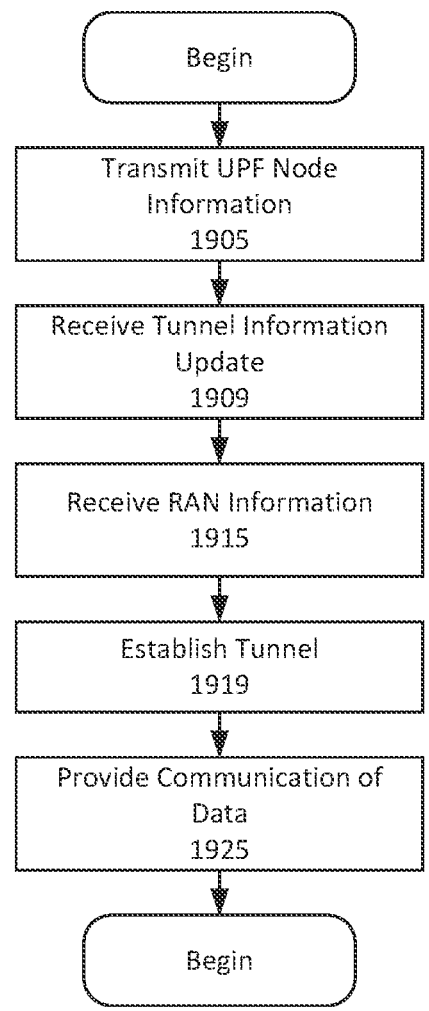

US 11,722,568 B2

METHODS PROVIDING DYNAMIC NEF TUNNEL ALLOCATION AND RELATED NETWORK NODES/FUNCTIONS

CROSS REFERENCE TO RELATED APPLICATIONS

This application is a 35 U.S.C. § 371 national stage application of PCT International Application No. PCT/EP2019/071036 filed on Aug. 5, 2019, which claims the benefit of U.S. Provisional Patent Application Ser. No. 62/741,179, filed on Oct. 4, 2018, the disclosures and content of which are incorporated by reference herein in their entireties.

TECHNICAL FIELD

The present disclosure relates generally to communications, and more particularly to communication networks and related methods and network nodes/entities.

BACKGROUND

3GPP has started an Internet of Things IoT study item for Fifth Generation 5Gs through TR 23.724 (reference [1]). One issue is how to handle the data delivery (e.g. NIDD; Non-IP Data Delivery) from the core network to NEF node. Solution 35 in 23.724 v1.0.0 is an approach when the wireless device UE delivers data through the user plane. In this approach, the UPF/NEF is a combined entity and no specific interface is defined between the UPF and NEF nodes. Such approaches, however, may not provide sufficient flexibility.

SUMMARY

According to some embodiments of inventive concepts, methods are provided to operate a Session Management Function SMF node of a wireless communication network. A request to create a session for a wireless device is received. A communication establishment request is transmitted to a Network Exposure Function NEF node responsive to receiving the request to create the session for the wireless device, wherein the communication establishment request includes UPF node information for a tunnel between a UPF node and the NEF node to be used for the session for the wireless device. A communication establishment response is received from the NEF node, wherein the communication establishment response includes NEF node information for the tunnel between the UPF node and the NEF node to be used for the session for the wireless device. A tunnel information update is transmitted to the UPF node after receiving the communication establishment response, wherein the tunnel information update includes the NEF node information for the tunnel between the UPF node and the NEF node.

According to some other embodiments of inventive concepts, methods are provided to operate a Network Exposure Function NEF node of a wireless communication network. Configuration information is provided to a unified data management UDM node, wherein the configuration information includes an identification of a wireless device UE associated with the NEF node. A communication establishment request is received from a Session Management Function SMF node after providing the configuration information, wherein the communication establishment request includes UPF node information for a tunnel between a UPF node and the NEF node to be used for a session for the wireless device. A communication establishment response is transmitted to the SMF node, wherein the communication establishment response includes NEF node information for the tunnel between the UPF node and the NEF node to be used for the session for the wireless device. The tunnel may be established between the NEF node and the UPF node for the session for the wireless device using the UPF node information for the tunnel. Communication of data for the session for the wireless device may be provided through the tunnel.

According to still other embodiments of inventive concepts, methods are provided to operate a User Plane Function UPF node of a wireless communication network. A tunnel information update is received from a Session Management Function SMF node, wherein the tunnel information update includes NEF node information for a tunnel between the UPF node and the NEF node to be used for a session for a wireless device. The tunnel is established between the NEF node and the UPF node for the session for the wireless device using the NEF node information for the tunnel. Communication of data for the session for the wireless device is provided through the tunnel.

According to some embodiment disclosed herein, tunnel allocation may be provided during session establishment with increased flexibility and/or without significantly increasing communication signaling between network function nodes.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 17 is a flow chart illustrating operations of an SMF node according to some embodiments of inventive concepts;

FIG. 18 is a flow chart illustrating operations of an NEF node according to some embodiments of inventive concepts; and FIG. 19 is a flow chart illustrating operations of a UPF node according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
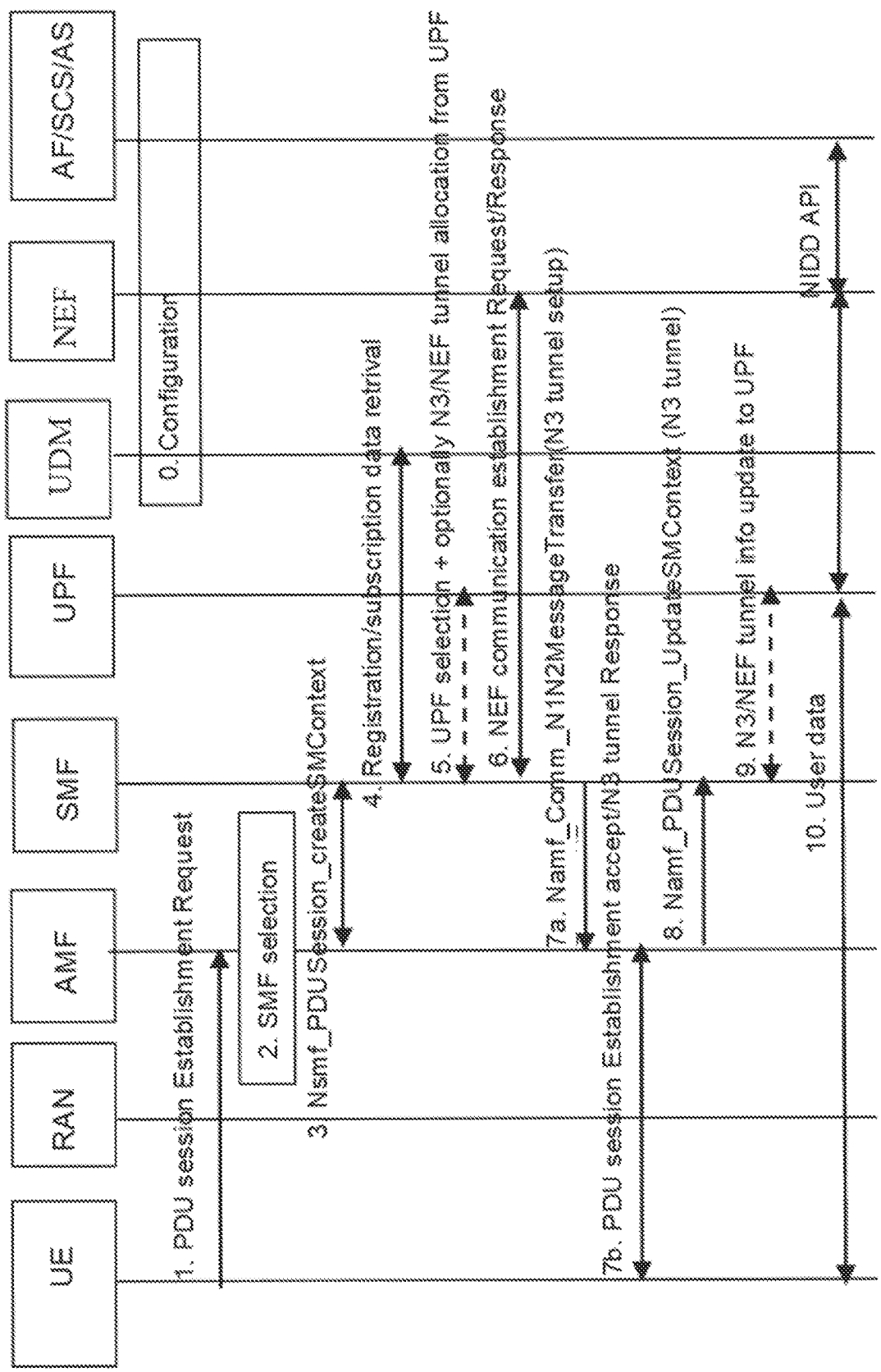
FIG. 4 is a message diagram illustrating setup procedures according to some embodiments of inventive concepts.
Figure 5:
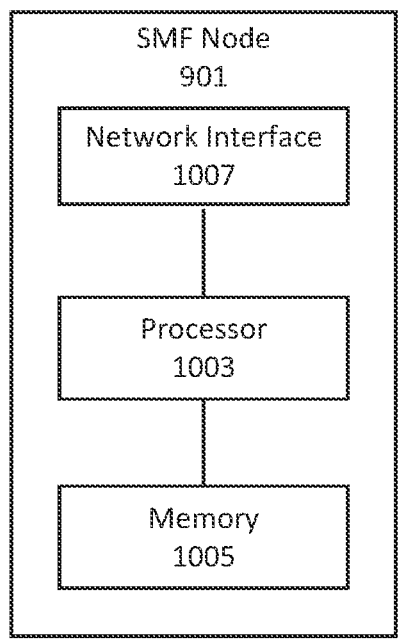
FIG. 5 is a block diagram illustrating an SMF service/node according to some embodiments of inventive concepts.

FIG. 5 is a block diagram illustrating elements of SMF node/entity/function/server 901 configured to support cellular communication according to some embodiments of inventive concepts. As shown, SMF node 901 may include a network interface circuit 1007 (also referred to as a network interface) configured to provide communications with other network nodes/entities/functions/servers. SMF node 901 may also include a processor circuit 1003 (also referred to as a processor) coupled to the network interface circuit 1007, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein (e.g., operations illustrated in FIG. 4, operations illustrated in FIG. 17, and/or operations discussed below with respect to respective Example Embodiments relating to SMF nodes). According to other embodiments, processor circuit 1003 may be defined to include memory so that a separate memory circuit is not required.

As discussed herein, operations of the SMF node 901 may be performed by processor 1003 and/or network interface 1007. For example, processor 1003 may control network interface 1007 to transmit communications through network interface 1007 to one or more other network nodes/entities/functions/servers and/or to receive communications through network interface from one or more other network nodes/entities/servers.

Moreover, modules may be stored in memory 1005, and these modules may provide instructions so that when instructions of a module are executed by processor 1003, processor 1003 performs respective operations. Operations of SMF node 901, for example, may be performed by one server or distributed across a plurality of network servers having the structure of FIG. 5, and a plurality of such distributed servers may be collectively referred to as a server. According to some embodiments of SMF node 901 may be provided as a virtual SMF node.

Figure 6:
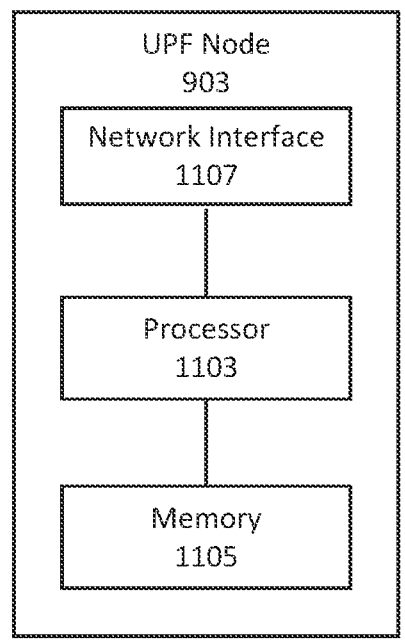
FIG. 6 is a block diagram illustrating a UPF service/node according to some embodiments of inventive concepts.

FIG. 6 is a block diagram illustrating elements of UPF node/entity/function/server 903 configured to support cellular communication according to some embodiments of inventive concepts. As shown, UPF node 903 may include a network interface circuit 1107 (also referred to as a network interface) configured to provide communications with other network nodes/entities/functions/servers. UPF node 903 may also include a processor circuit 1103 (also referred to as a processor) coupled to the network interface circuit 1107, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein (e.g., operations illustrated in FIG. 4, operations illustrated in FIG. 19, and/or operations discussed below with respect to respective Example Embodiments relating to UPF nodes). According to other embodiments, processor circuit 1103 may be defined to include memory so that a separate memory circuit is not required.

As discussed herein, operations of the UPF node 903 may be performed by processor 1103 and/or network interface 1107. For example, processor 1103 may control network interface 1107 to transmit communications through network interface 1107 to one or more other network nodes/entities/functions/servers and/or to receive communications through network interface from one or more other network nodes/entities/functions/servers. Moreover, modules may be stored in memory 1105, and these modules may provide instructions so that when instructions of a module are executed by processor 1103, processor 1103 performs respective operations. Operations of UPF node 903, for example, may be performed by one server or distributed across a plurality of network servers having the structure of FIG. 6, and a plurality of such distributed servers may be collectively referred to as a server. According to some embodiments UPF node 903 may be provided as a virtual UPF node.

Figure 7:
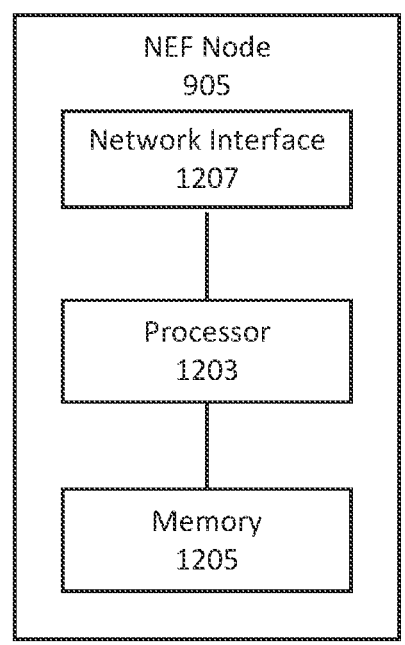
FIG. 7 is a block diagram illustrating an NEF service/node according to some embodiments of inventive concepts.

FIG. 7 is a block diagram illustrating elements of NEF node/entity/functions/server 905 configured to support cellular communication according to some embodiments of inventive concepts. As shown, NEF node 905 may include a network interface circuit 1207 (also referred to as a network interface) configured to provide communications with other network nodes/entities/functions/servers. NEF node 905 may also include a processor circuit 1203 (also referred to as a processor) coupled to the network interface circuit 1207, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein (e.g., operations illustrated in FIG. 4, operations illustrated in FIG. 18, and/or operations discussed below with respect to respective Example Embodiments relating to NEF nodes). According to other embodiments, processor circuit 1203 may be defined to include memory so that a separate memory circuit is not required.

As discussed herein, operations of the NEF node 905 may be performed by processor 1203 and/or network interface 1207. For example, processor 1203 may control network interface 1207 to transmit communications through network interface 1207 to one or more other network nodes/entities/functions/servers and/or to receive communications through network interface from one or more other network nodes/entities/functions/servers. Moreover, modules may be stored in memory 1205, and these modules may provide instructions so that when instructions of a module are executed by processor 1203, processor 1203 performs respective operations. Operations of NEF node 905, for example, may be performed by one server or distributed across a plurality of network servers having the structure of FIG. 12, and a plurality of such distributed servers may be collectively referred to as a server. According to some embodiments NEF node 905 may be provided as a virtual NEF node.

While FIGS. 5, 6, and 7 illustrate structures of an SMF node/entity/function/server, a UPF node/entity/function/server, and an NEF node/entity/function/server respectively, other network nodes/entities/functions/servers may have the same/similar structure including a network interface, a processor, and memory. For example, such a structure including a network interface, a processor, and memory may be used for an AMF node/entity/functions/server, a UDM node/entity/functions/server, an AF node/entity/functions/server, an SCS node/entity/functions/server, an AS node/entity/functions/server, and/or any other node/entity/functions/server of the wireless communication network. A RAN node may be provided using a similar structure with a transceiver also coupled with the processor to provide wireless communication with one or more wireless devices (also referred to as UEs, User Equipment, User Equipment nodes, wireless terminals, etc.) over a radio interface.

The logic interface between UPF and NEF nodes may be defined by 3GPP as an alternative deployment possibility to the current approach where UPF/NEF is collocated.

Figure 1:
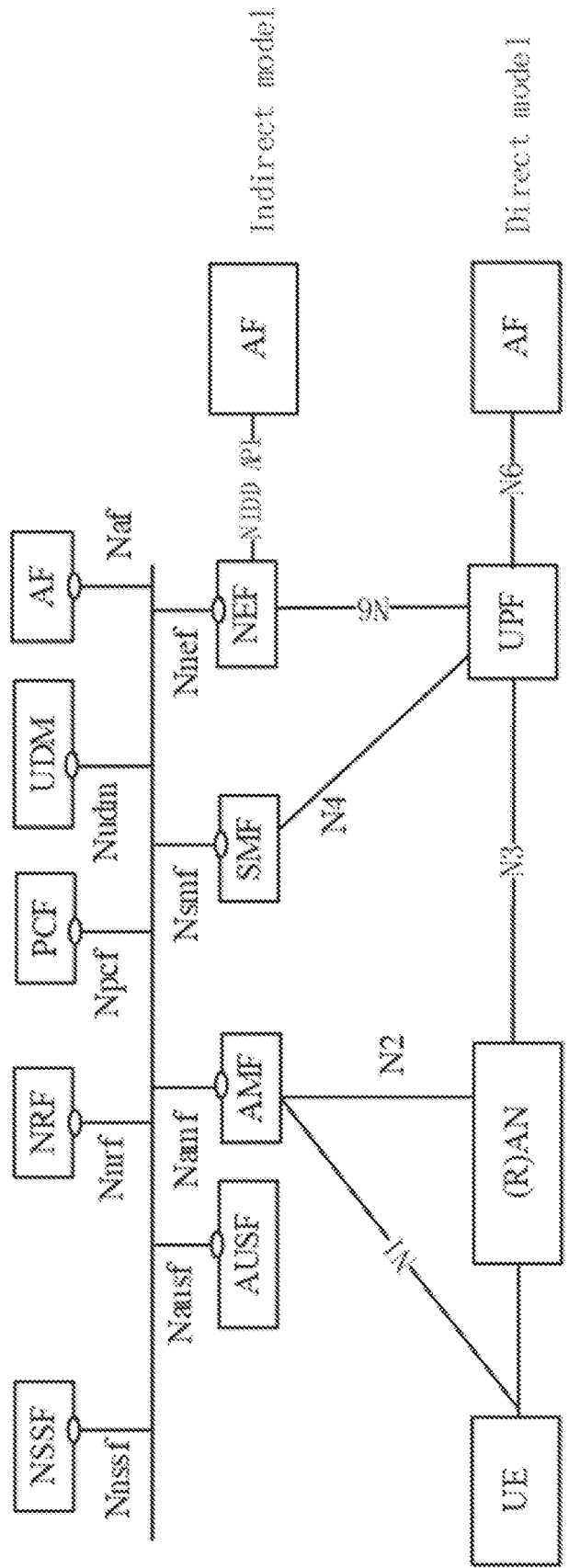
FIG. 1 is a block diagram illustrating a 5G non-roaming architecture.

FIG. 1 shows a case where the UPF and NEF nodes are located separately. In this case, NEF acts as an application server in the DN and transfers data to/from the UPF via the N6 interface.

Figure 2:
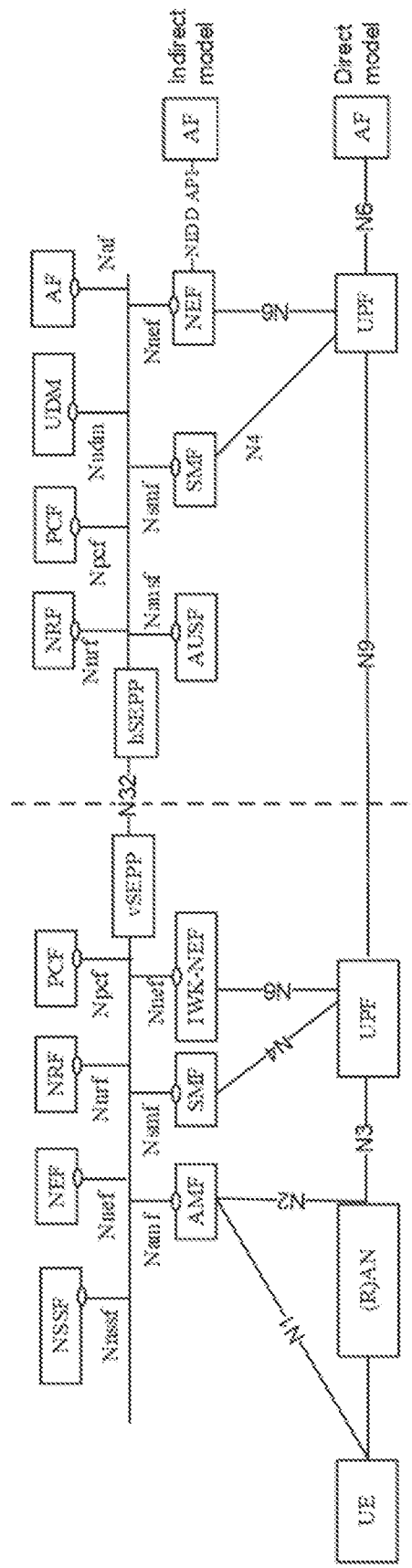
FIG. 2 is a block diagram illustrating roaming 5G system architecture.

Roaming may be supported as shown in FIG. 2. For a home-routed roaming case, UPF in VPLMN connects to UPF in HPLMN with the N9 interface which has connectivity via N6 with NEF in HPLMN. For a local breakout roaming case, UPF in VPLMN establishes N6 interface with IWK-NEF in VPLMN which connects to NEF in HPLMN.

FIG. 1 illustrates a 5G non-roaming architecture reference model.

FIG. 2 illustrates a roaming 5G System architecture.

Figure 3:
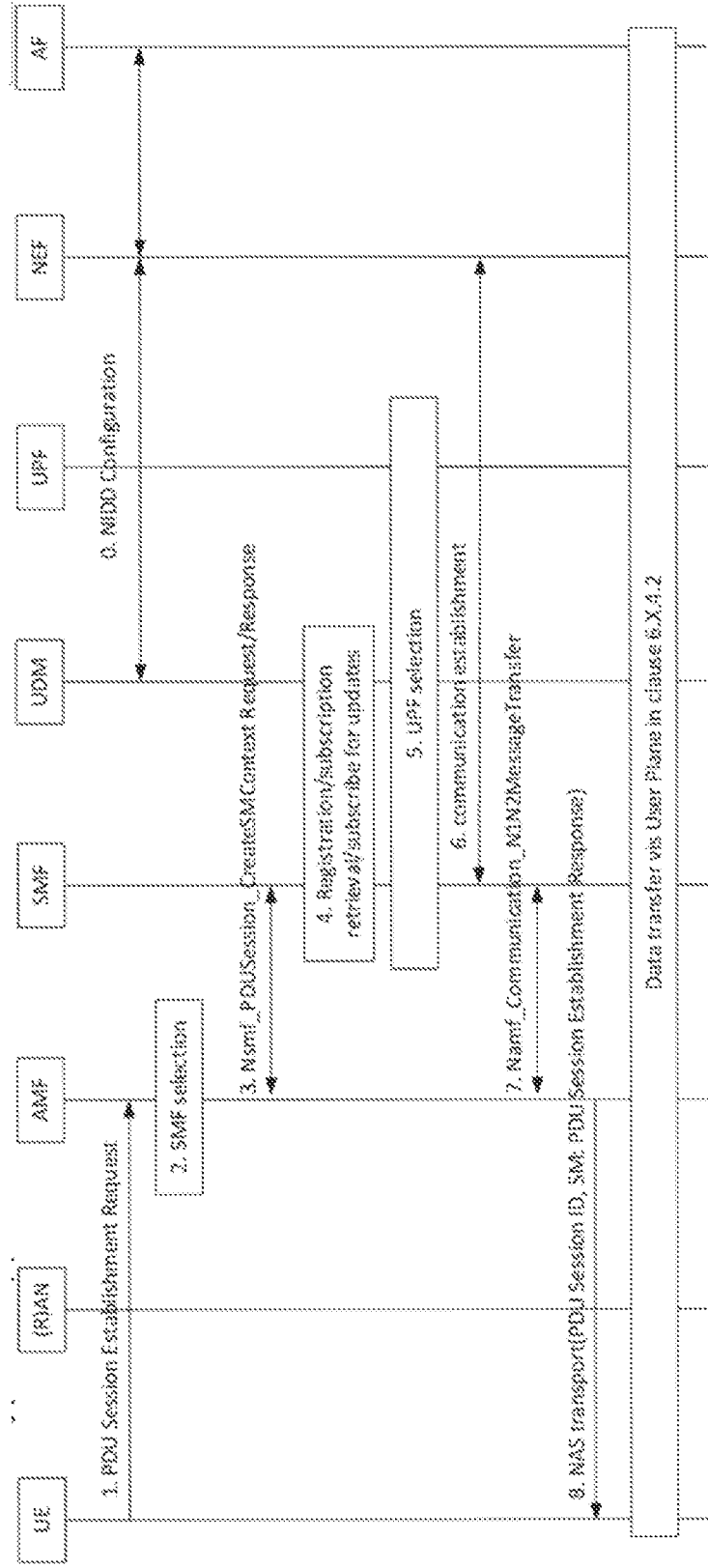
FIG. 3 is a message diagram illustrating a small data transfer path setup procedure.

The procedure of FIG. 3 may be added to show how the tunnel between UPF and NEF is established when the UPF and NEF are separated. FIG. 3 shows a connection setup/establishment procedure for Small Data Communication using T8 when the UPF and NEF are located separately. IP (IPv4, IPv6) or Unstructured (Non-IP) PDU session type may be supported.

FIG. 3 shows a small data transfer path setup procedure.

It is assumed that NIDD configuration between NEF and AF has been performed already at operation 0 (i.e., before operations 1-8). During NIDD configuration, the NEF stores NIDD configuration parameters along with NEF's routing information (e.g., IPv6 address, port number, etc.) to the UE's SM subscription data. The data path to the NEF for Small Data Communication using T8 is established by the UE performing a Protocol Data Unit PDU Session Establishment procedure.

The PDU Session Establishment Procedure is performed as defined in TS 23.502 (reference [3]) with the following additions shown in FIG. 3:

Operation 1. The UE includes in PDU Session Establishment Request a specific Data Network Name DNN for Small Data Communication using T8 services as per UE Rout Selection Policy URSP.

Operation 2. The AMF selects an SMF based on the specific DNN requested by the UE along with the other parameters as specified in TS 23.502 (reference [3]).

Operation 4. The SMF determines based on e.g. DNN or local DNN configuration, that the PDU Session is used for Small Data Communication using T8. The SMF retrieves NEF information from the UE's subscription data in the UDM, i.e. IPv6 address and UDP port of the NEF.

Operation 5. The SMF selects a UPF supporting Small Data Communication using T8. If the UE requests IP PDU session type (e.g., IPv4, IPv6), the SMF allocates an IP address/prefix for the PDU Session as described in TS 23.501 (reference [2]) clause 5.8.1. If the UE requests Unstructured PDU session type, the SMF allocates an IPv6 prefix for the PDU Session without involving the UE. The SMF configures the UPF the N6 point-to-point tunneling information (e.g., IPv6 address, UDP port for the NEF) with IP address for the PDU session.

Operation 6. If PDU Session type is IP, the SMF provides the NEF the allocated IP address/prefix for the UE for the PDU Session with NIDD configuration parameters, e.g., External Identifier, AF ID (i.e., T8 destination address), and DNN as retrieved in Step 4. The NEF associates the NIDD configuration for the UE with the allocated IP address/prefix for the UE for the PDU Session.

If PDU Session type is Unstructured, the SMF sends N6 point-to-point tunneling information of the UPF to the NEF with NIDD configuration parameters e.g., External Identifier, AF ID (i.e., T8 destination address), and DNN as retrieved in Step 4. The NEF associates the NIDD configuration for the UE with the N6 point-to-point tunneling information for the UPF.

Operation 7. If the UE requests IP PDU session type, the SMF sends NEF information (i.e. IP address or port number of the NEF) in PCO to the UE. The UE uses NEF information as a destination address when it sends data.

The approach of FIG. 3 is based on the logic that the NEF will allocate rather static tunnel information (e.g. IP address, UDP port number) between UPF and NEF of the PDU session (i.e. in operation 0 of FIG. 3) before the PDU session is established (i.e. in operation 1 of FIG. 3). Then the tunnel info is pushed from NEF to UDM as part of the subscription data and wait for the SMF to retrieve it in operation 4.

In 5GS with SBA based architecture, the deployment of NEF instance and its resource allocation may be more/very flexible and dynamic. The approach of FIG. 3 may not fit well with the 5GS SBA concept.

According to some embodiments disclosed herein, the NEF may allocate tunnel resources more dynamically during PDU session establishment.

1) When the AF performs NIDD configuration through NEF, NEF may only need to provide the NEF ID information to the UDM.
2) When the SMF tries to establish the tunnel between UPF and NEF, the SMF may only provide the UPF tunnel info to NEF. And NEF can allocate the NEF tunnel info in the Response.
3) The SMF may update the UPF with both N3 RAN tunnel info and tunnel info from NEF in one signaling.

Some embodiments may provide flexible NEF tunnel allocation logic during PDU session establishment with the consideration of NEF dynamic resource allocation without necessarily increasing communication signaling between NF.

Some embodiments of inventive concepts are discussed below with respect to the message diagram of FIG. 4. In FIG. 4, NIDD configuration between NEF and AF may be performed at operation 0 before performing operations 1-10. During NIDD configuration, the NEF stores NIDD configuration parameters along with NEF's ID to the UE's SM subscription data. The data path to the NEF for Small Data Communication using T8 may be established by the UE performing a PDU Session Establishment procedure.

The PDU Session Establishment Procedure is performed as defined in TS 23.502 (reference [3]) with the following additions:

Operation 1. The UE includes in PDU Session Establishment Request a specific DNN for Small Data Communication using T8 services as per URSP.

Operation 2-3. The AMF selects a SMF based on the specific DNN requested by the UE along with the other parameters as specified in TS 23.502 (reference [3]).

Operation 4. The SMF determines based on e.g. DNN or local DNN configuration, that the PDU Session is used for Small Data Communication using T8. The SMF retrieves NEF information from the UE's subscription data in the UDM, i.e. NEF ID.

Operation 5. The SMF selects a UPF supporting Small Data Communication using T8. If the UE requests IP PDU session type (e.g., IPv4, IPv6), the SMF allocates (or through UPF to allocates) an IP address/prefix for the PDU Session as described in TS 23.501 (reference [2] clause 5.8.1. If the UE requests Unstructured PDU session type, the SMF allocates an IPv6 prefix for the PDU Session without involving the UE.

Operation 6. If PDU Session type is IP, the SMF provides the NEF the allocated IP address/prefix for the UE for the PDU Session with NIDD configuration parameters, e.g., External Identifier, AF ID (i.e., T8 destination address), and DNN as retrieved in Step 4 and/or N6 point-to-point tunneling information of the UPF. The NEF associates the NIDD configuration for the UE with the allocated IP address/prefix for the UE for the PDU Session. The NEF also allocates the tunnel information (e.g. N6 UPF-NEF point-to-point tunnel information with IP address UDP port of the NEF, and optionally the direct NEF information with IP address or port number for wireless device) for the PDU session.

If PDU Session type is Unstructured, the SMF sends N6 point-to-point tunneling information of the UPF to the NEF with NIDD configuration parameters e.g., External Identifier, AF ID (i.e., T8 destination address), and DNN as retrieved in Step 4. The NEF associates the NIDD configuration for the UE with the N6 point-to-point tunneling information for the UPF. The NEF also allocates the tunnel information (e.g. N6 UPF-NEF point-to-point tunnel information with IP address UDP port of the NEF) for the PDU session.

Operation 7. The SMF formulates N3 tunnel setup requests to RAN if UP plane is used for small data delivery among UE/RAN/UPF, and N1 PDU session establishment accept message and delivery to RAN via AMF If the UE requests IP PDU session type, the SMF sends NEF information (i.e. the direct NEF information with IP address or port number for the wireless device received in operation 6) in PCO to the UE. The UE uses NEF information as a destination address when it sends data.

Operation 8. RAN provides N3 tunnel information to SMF via AMF.

Operation 9. The SMF provides both the N3 tunnel information from RAN and the NEF tunnel inform from step 6 to the UPF via N4 interface message. This can be done by providing information for both tunnels (RAN N3 tunnel information from step 8 and N6 UPF-NEF point-to-point tunnel information of NEF from step 6) using a single N4 message, or alternatively using two different N4 messages.

NOTE: the N4 message/service that provides RAN N3 message to UPF may be provided using "PFCP Session Establishment Request/Response messages" from the approach of solution 35 in TR 23.724 (reference [1]).

Operation 10. AF and UE can start data delivery through NEF/UPF. The uplink/downlink data for the wireless device UE may be communicated using an N3 tunnel between the RAN node and the UPF node and an N6 tunnel between the UPF node and the NEF node.

Dynamic N6 UPF-NEF point-to-point tunnel resource allocation during PDU session establishment may thus be provided for a Small data communication over T8.

An SMF node may allocate and/or retrieve the UPF N6 Tunnel information from UPF. (The NEF is selected based on the NEF ID received from the UDM). The SMF then establishes a UPF- NEF tunnel by interaction with the NEF using a NEF service (or message). The NEF receives the UPF N6 Tunnel information, stores it, allocates a corresponding NEF N6 Tunnel Information, which is passed back to SMF. The SMF receives the NEF N6 Tunnel Information in the response, which the SMF in next step provides to the UPF. By which the UPF-NEF N6 Tunnel is established.

Operations of an SMF node 901 (implemented using the structure of FIG. 5) will now be discussed with reference to the flow chart of FIG. 17 according to some embodiments of inventive concepts. For example, modules may be stored in memory 1005 of FIG. 5, and these modules may provide instructions so that when the instructions of a module are executed by respective SMF node processor 1003 (also referred to as a processing circuitry), processor 1003 performs respective operations of the flow chart.

At block 1705, processor 1003 may receive (through network interface 1007) a request to create a session for a wireless device UE, for example, as discussed above with respect to operation 3 of FIG. 4.

At block 1709, processor 1003 may obtain subscription information for the wireless device responsive to receiving the request to create the session for the wireless device, for example, as discussed above with respect to operation 4 of FIG. 4, with the subscription information for the wireless device including NEF information associated with the wireless device. The NEF information associated with the wireless device, for example, may include a NEF identifier of a NEF node associated with the wireless device. Moreover, obtaining the subscription information may include transmitting (through network interface 1007) a request for the subscription information to a Unified Data Management UDM node, and receiving (through network interface 1007) the subscription information from the UDM node.

At block 1715, processor 1003 may select a User Plane Function UPF node for the session for the wireless device responsive to receiving the request to create the session, for example, as discussed above with respect to operation 5 of FIG. 4. Selecting the UPF node may also include obtaining the UPF node information for a first tunnel between the UPF node and the NEF node that is included in the communication establishment request. In addition, selecting the UPF node may include obtaining UPF node information for a second tunnel between the UPF node and a radio access node RAN associated with the wireless device, with the second tunnel to be used for the session for the wireless device.

At block 1717, processor 1003 may transmit (through network interface 1007) a communication establishment request to a Network Exposure Function NEF node responsive to receiving the request to create the session for the wireless device, with the communication establishment request including UPF node information for the first tunnel between a UPF node and the NEF node to be used for the session for the wireless device, for example, as discussed above with respect to operation 6 of FIG. 4. Moreover, the communication establishment request may be transmitted to the NEF node based on the NEF information associated with the wireless device.

At block 1719, processor 1003 may receive (through network interface 1007) a communication establishment response from the NEF node, for example, as discussed above with respect to operation 6 of FIG. 4, with the communication establishment response including NEF node information for the first tunnel between the UPF node and the NEF node to be used for the session for the wireless device.

At block 1725, processor 1003 may transmit (through network interface 1007) a tunnel setup request to the RAN, for example, as discussed above with respect to operation 7a of FIG. 4, with the tunnel setup request including the UPF node information for the second tunnel between the UPF node and the RAN.

At block 1729, processor 1003 may receive (through network interface 1007) a session establishment accept message from the RAN, for example, as discussed above with respect to operation 8 of FIG. 4, with the session establishment accept message including RAN information for the second tunnel between the UPF node and the RAN.

At block 1735, processor 1003 may transmit (through network interface 1007) a tunnel information update to the UPF node after receiving the communication establishment response, for example, as discussed above with respect to operation 9 of FIG. 4, with the tunnel information update including the NEF node information for the first tunnel between the UPF node and the NEF node and the RAN information for the second tunnel.

Various operations from the flow chart of FIG. 17 may be optional with respect to some embodiments of SMF nodes and related methods. Regarding methods of example embodiment 1 (set forth below), for example, operations of blocks 1709, 1715, 1725, and 1729 of FIG. 17 may be optional.

Operations of an NEF node 905 (implemented using the structure of FIG. 7) will now be discussed with reference to the flow chart of FIG. 18 according to some embodiments of inventive concepts. For example, modules may be stored in memory 1205 of FIG. 7, and these modules may provide instructions so that when the instructions of a module are executed by respective NEF node processor 1203 (also referred to as processing circuitry), processor 1203 performs respective operations of the flow chart.

At block 1805, processor 1203 may provide configuration information to a unified data management UDM node, for example, as discussed above with respect to operation 0 of FIG. 4, with the configuration information including an identification of a wireless device UE associated with the NEF node.

At block 1809, processor 1203 may receive (through network interface 1207) a communication establishment request from a Session Management Function SMF node after providing the configuration information, for example, as discussed above with respect to operation 6 of FIG. 4, with the communication establishment request including UPF node information for a tunnel between a UPF node and the NEF node to be used for a session for the wireless device. The UPF node information, for example, may include a UPF address and/or a UPF port number of the UPF node to be used for the tunnel. Moreover, the communication establishment request may include an identification of the wireless device.

At block 1815, processor 1203 may transmit (through network interface 1207) a communication establishment response to the SMF node, for example, as discussed above with respect to operation 6 of FIG. 4, with the communication establishment response including NEF node information for the tunnel between the UPF node and the NEF node to be used for the session for the wireless device. The NEF node information may include a NEF address and/or a NEF port number of the NEF node to be use for the tunnel. Moreover, the communication establishment response may include an identification of the wireless device.

At block 1819, processor 1203 may establish the tunnel between the NEF node and the UPF node for the session for the wireless device using the UPF node information for the tunnel, for example, as discussed above with respect to operation 10 of FIG. 4. For example, the tunnel between the UPF node and the NEF node may be a tunnel over an N6 interface between the UPF node and the NEF node.

At block 1825, processor 1203 may provide communication of data for the session for the wireless device through the tunnel.

Various operations from the flow chart of FIG. 18 may be optional with respect to some embodiments of NEF nodes and related methods.

Operations of a UPF node 903 (implemented using the structure of FIG. 6) will now be discussed with reference to the flow chart of FIG. 19 according to some embodiments of inventive concepts. For example, modules may be stored in memory 1105 of FIG. 6, and these modules may provide instructions so that when the instructions of a module are executed by respective UPF node processing circuitry 1103, processing circuitry 1103 performs respective operations of the flow chart.

At block 1905, processor 1103 may transmit (through network interface 1107) UPF node information for a first tunnel between the UPF node and an NEF node to an SMF node, for example, as discussed above with respect to operation 5 of FIG. 4. For example, the UPF node information may include a UPF address and/or a UPF port number of the UPF node to be used for the first tunnel.

At block 1909, processor 1103 may receive (through network interface 1107) a tunnel information update from a Session Management Function SMF node, for example, as discussed above with respect to operation 9 of FIG. 4, with the tunnel information update including NEF node information for the first tunnel between the UPF node and the NEF node to be used for a session for a wireless device.

At block 1915, processor 1103 may receive (through network interface 1107) Radio Access Network RAN information for the second tunnel between a RAN node and the UPF node, for example, as discussed above with respect to operation 9 of FIG. 4. According to some embodiments, the tunnel information update may include the RAN information for the second tunnel and the NEF node information for the first tunnel so that that the RAN information for the second tunnel and the NEF node information for the first tunnel are received in a single message. Stated in other words, operations of blocks 1909 and 1915 may be combined. The second tunnel between the RAN and the UPF node, for example, may be a tunnel over an N3 interface between the RAN node and the UPF node, and the RAN information may include a RAN address and/or a RAN port number to be used for the second tunnel.

At block 1919, processor 1103 may establish the tunnel between the NEF node and the UPF node for the session for the wireless device using the NEF node information for the tunnel, for example, as discussed above with respect to operation 10 of FIG. 4.

At block 1925, processor 1103 may provide communication of data for the session for the wireless device through the tunnel.

Various operations from the flow chart of FIG. 19 may be optional with respect to some embodiments of UPF nodes and related methods. Regarding methods of example embodiment 35 (set forth below), for example, operations of blocks 1905 and 1915 of FIG. 19 may be optional.

Example embodiments of inventive concepts are set forth below.

1. A method of operating a Session Management Function, SMF, node (901) of a wireless communication network, the method comprising: receiving (operation 3, FIG. 4) a request to create a session for a wireless device (UE); transmitting (operation 6, FIG. 4) a communication establishment request to a Network Exposure Function, NEF, node (905) responsive to receiving the request to create the session for the wireless device, wherein the communication establishment request includes UPF node information for a tunnel between a UPF node (903) and the NEF node to be used for the session for the wireless device; receiving (operation 6, FIG. 4) a communication establishment response from the NEF node, wherein the communication establishment response includes NEF node information for the tunnel between the UPF node and the NEF node to be used for the session for the wireless device; and transmitting (operation 9, FIG. 4) a tunnel information update to the UPF node after receiving the communication establishment response, wherein the tunnel information update includes the NEF node information for the tunnel between the UPF node and the NEF node.

2. The method of Embodiment 1 further comprising: obtaining (operation 4, FIG. 4) subscription information for the wireless device responsive to receiving the request to create the session for the wireless device, wherein the subscription information for the wireless device includes NEF information associated with the wireless device; wherein transmitting the communication establishment request comprises transmitting the communication establishment request to the NEF node based on the NEF information associated with the wireless device.

3. The method of Embodiment 2, wherein the NEF information associated with the wireless device includes a NEF identifier of a NEF node associated with the wireless device.

4. The method of any of Embodiments 2-3, wherein obtaining the subscription information comprises transmitting a request for the subscription information to a Unified Data Management, UDM, node, and receiving the subscription information from the UDM node.

5. The method of any of Embodiments 2-4 further comprising: selecting (operation 5, FIG. 4) a User Plane Function, UPF, node for the session for the wireless device responsive to receiving the request to create the session.

6. The method of Embodiment 5, wherein selecting the UPF node includes obtaining the UPF node information for the tunnel between the UPF node and the NEF node that is included in the communication establishment request.

7. The method of Embodiment 5, wherein selecting the UPF node comprises transmitting a UPF selection message for the session to the UPF node and receiving a UPF selection response including the UPF node information for the tunnel between the UPF node and the NEF node that is included in the communication establishment response.

8. The method of any of Embodiments 5-7, wherein the request to create the session includes an indication of a Data Network Name, DNN, to be used for the session, and wherein selecting the UPF node comprises selecting the UPF node based on the DNN to be used for the session.

9. The method of any of Embodiments 1-8, wherein the request to create the session is received from an Access and Mobility Management Function, AMF, node of the wireless communication network.

10. The method of any of Embodiments 5-8, wherein the tunnel between the UPF node and the NEF node is a first tunnel, and wherein selecting the UPF node includes obtaining UPF node information for a second tunnel between the UPF node and a radio access node, RAN, associated with the wireless device, and wherein the second tunnel is to be used for the session for the wireless device, the method further comprising: transmitting (operation 7a, FIG. 4) a tunnel setup request to the RAN, wherein the tunnel setup request includes the UPF node information for the second tunnel between the UPF node and the RAN; receiving (operation 8, FIG. 4) a session establishment accept message from the RAN, wherein the session establishment accept message includes RAN information for the second tunnel between the UPF node and the RAN; and transmitting (operation 9, FIG. 4) the RAN information for the second tunnel to the UPF node.

11. The method of Embodiment 10, wherein the tunnel information update includes the RAN information for the second tunnel and the NEF node information for the first tunnel so that that the RAN information for the second tunnel and the NEF node information for the first tunnel are transmitted in a single message.

12. The method of any of Embodiments 10-11, wherein the second tunnel between the RAN and the UPF node is a tunnel over an N3 interface between the RAN and the UPF node.

13. The method of any of Embodiments 10-12, wherein the RAN node information includes a RAN address and/or a RAN port number to be used for the second tunnel.

14. The method of any of Embodiments 1-13, wherein the UPF node information includes a UPF address and/or a UPF port number of the UPF node to be used for the tunnel.

15. The method of any of Embodiments 1-14, wherein the NEF node information includes a NEF address and/or a NEF port number of the NEF node to be use for the tunnel.

16. The method of any of Embodiments 1-15, wherein the tunnel between the UPF node and the NEF node is a tunnel over an N6 interface between the UPF node and the NEF node.

17. The method of any of Embodiments 1-16, wherein the request to create the session, the communication establishment request, the communication establishment response, and/or the tunnel information update includes an identification of the wireless device.

18. The method of Embodiment 17, wherein the identification of the wireless device comprises at least one of an IMSI and/or a SUPI.

19. The method of any of Embodiments 1-18, wherein the communication establishment request further includes an IP address of the wireless device allocated for the session for the wireless device.

20. The method of any of Embodiments 1-19, wherein the NEF node information includes an IP address of the NEF node and/or a port number of the NEF node allocated for the session for the wireless device.

21. An SMF node (901) for a communication network, wherein the SMF Node is adapted to perform operations according to any of Embodiments 1-20.

22. A Session Management Function (SMF) node (901) for a communication network, the SMF node comprising: a processor (1003); and memory (1005) coupled with the processor, wherein the memory comprises instructions that when executed by the processor cause the processor to perform operations according to any of Embodiments 1-20.

23. A method of operating a Network Exposure Function, NEF, node (905) of a wireless communication network, the method comprising: providing (operation 0, FIG. 4) configuration information to a unified data management, UDM, node, wherein the configuration information includes an identification of a wireless device (UE) associated with the NEF node; receiving (operation 6, FIG. 4) a communication establishment request from a Session Management Function, SMF, node (901) after providing the configuration information, wherein the communication establishment request includes UPF node information for a tunnel between a UPF node (903) and the NEF node to be used for a session for the wireless device; transmitting (operation 6, FIG. 4) a communication establishment response to the SMF node, wherein the communication establishment response includes NEF node information for the tunnel between the UPF node and the NEF node to be used for the session for the wireless device; establishing (operation 10, FIG. 4) the tunnel between the NEF node and the UPF node for the session for the wireless device using the UPF node information for the tunnel; and providing communication of data for the session for the wireless device through the tunnel.

24. The method of Embodiment 23, wherein the tunnel is a first tunnel, wherein providing communication comprises providing communication of the data for the session for the wireless device through the first tunnel between the UPF node and the NEF node and through a second tunnel between the NEF node and another node (AF/SCS/AS).

25. The method of Embodiment 24, wherein the second tunnel is provided using a NIDD API interface.

26. The method of any of Embodiments 23-25, wherein the UPF node information includes a UPF address and/or a UPF port number of the UPF node to be used for the tunnel.

27. The method of any of Embodiments 23-26, wherein the NEF node information includes a NEF address and/or a NEF port number of the NEF node to be use for the tunnel.

28. The method of any of Embodiments 23-27, wherein the tunnel between the UPF node and the NEF node is a tunnel over an N6 interface between the UPF node and the NEF node.

29. The method of any of Embodiments 23-28, wherein the communication establishment request and/or the communication establishment response includes an identification of the wireless device.

30. The method of Embodiment 29, wherein the identification of the wireless device comprises at least one of an IMSI and/or an SUPI.

31. The method of any of Embodiments 23-30, wherein the communication establishment request further includes an IP address of the wireless device allocated by the SMF/UPF for the session for the wireless device.

32. The method of any of Embodiments 23-31, wherein the NEF node information includes an IP address of the NEF node and/or a port number of the NEF node allocated for the session for the wireless device.

33. A Network Exposure Function, NEF, node (905) for a communication network, wherein the NEF Node is adapted to perform operations according to any of Embodiments 23-32.

34. A Network Exposure Function, NEF, node (905) for a communication network, the NEF node comprising: a processor (1203); and memory (1205) coupled with the processor, wherein the memory comprises instructions that when executed by the processor cause the processor to perform operations according to any of Embodiments 23-32.

35. A method of operating a User Plane Function, UPF, node (903) of a wireless communication network, the method comprising: receiving (operation 9, FIG. 4) a tunnel information update from a Session Management Function, SMF, node (901), wherein the tunnel information update includes NEF node information for a tunnel between the UPF node and the NEF node to be used for a session for a wireless device; establishing (operation 10, FIG. 4) the tunnel between the NEF node and the UPF node for the session for the wireless device using the NEF node information for the tunnel; and providing communication of data for the session for the wireless device through the tunnel.

36. The method of Embodiment 35 further comprising: transmitting (operation 5, FIG. 4) UPF node information for the tunnel between the UPF node and the NEF node to the SMF node.

37. The method of Embodiments 36, wherein the UPF node information includes a UPF address and/or a UPF port number of the UPF node to be used for the tunnel.

38. The method of any of Embodiments 35-37, wherein the tunnel is a first tunnel, the method further comprising: receiving (operation 9, FIG. 4) Radio Access Network, RAN, information for a second tunnel between a RAN node and the UPF node.

39. The method of Embodiment 38, wherein the tunnel information update includes the RAN information for the second tunnel and the NEF node information for the first tunnel so that that the RAN information for the second tunnel and the NEF node information for the first tunnel are received in a single message.

40. The method of any of Embodiments 38-39, wherein the second tunnel between the RAN and the UPF node is a tunnel over an N3 interface between the RAN node and the UPF node.

41. The method of any of Embodiments 38-40, wherein the RAN information includes a RAN address and/or a RAN port number to be used for the second tunnel.

42. The method of any of Embodiments 38-41, wherein providing communication comprises providing communication of the data for the session for the wireless device through the first tunnel between the UPF node and the NEF node and through the second tunnel between the UPF node and the RAN node.

43. The method of any of Embodiments 35-42, wherein the NEF node information includes a NEF address and/or a NEF port number of the NEF node to be use for the tunnel.

44. The method of any of Embodiments 35-43, wherein the tunnel between the UPF node and the NEF node is a tunnel over an N6 interface between the UPF node and the NEF node.

45. The method of any of Embodiments 35-44, wherein the tunnel information update includes an identification of the wireless device.

46. The method of Embodiment 45, wherein the identification of the wireless device comprises at least one of an IMSI and/or an SUPI.

47. A User Plane Function, UPF, node (903) for a communication network, wherein the NEF Node is adapted to perform operations according to any of Embodiments 35-46.

48. A User Plane Function, UPF, node (903) for a communication network, the NEF node comprising: a processor (1103); and memory (1105) coupled with the processor, wherein the memory comprises instructions that when executed by the processor cause the processor to perform operations according to any of Embodiments 35-46.

Explanations for abbreviations from the above disclosure are provided below.

| Abbreviation | Explanation |
| --- | --- |
| 5G | 5$^{th}$ Generation |
| AF | Application Function |
| AMF | Access and Mobility Management Function |
| API | Application Programming Interface |
| AS | Application Server |
| DN | Data Network |
| DNN | Data Network Name |
| HPLM | Home Public Land Mobile |
| ID | Identifier |
| IoT | Internet of Things |
| IMSI | International Mobile Subscriber Identity |
| IP | Internet Protocol |
| NEF | Network Exposure Function |
| NIDD | Non-IP Data Delivery |
| PFCP | Packet Forwarding Control Protocol |
| PCO | Protocol Configuration Options |
| PDU | Protocol Data Unit |
| RAN | Radio Access Network |
| SBA | Service Based Architecture |
| SCS | Service Capability Server |
| SM | Short Message |
| SMF | Session Management Function |
| SUPI | Subscriber Permanent Identifier |
| UDM | Unified Data Management |
| UDP | User Datagram Protocol |
| UE | User Equipment |
| URSP | UE Rout Selection Policy |
| UP | User Plane |
| UPF | User Plane Function |
| VPLM | Visited Public Land Mobile |

Citations for references from the above disclosure are provided below.

Reference [1] 3GPP TR 23.724 v1.0.0
Reference [2] 3GPP TR 23.501 v15.3.0
Reference [3] 3GPP TR 23.502 v15.3.0
Reference [4] Samsung, Ericsson, SK Telecom, Solution 35 update: connectivity between UPF and NEF for NIDD, SA WG2 Meeting #129, S2-1810336, 15 Oct. 19 Oct. 2018, Dongguan, China.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
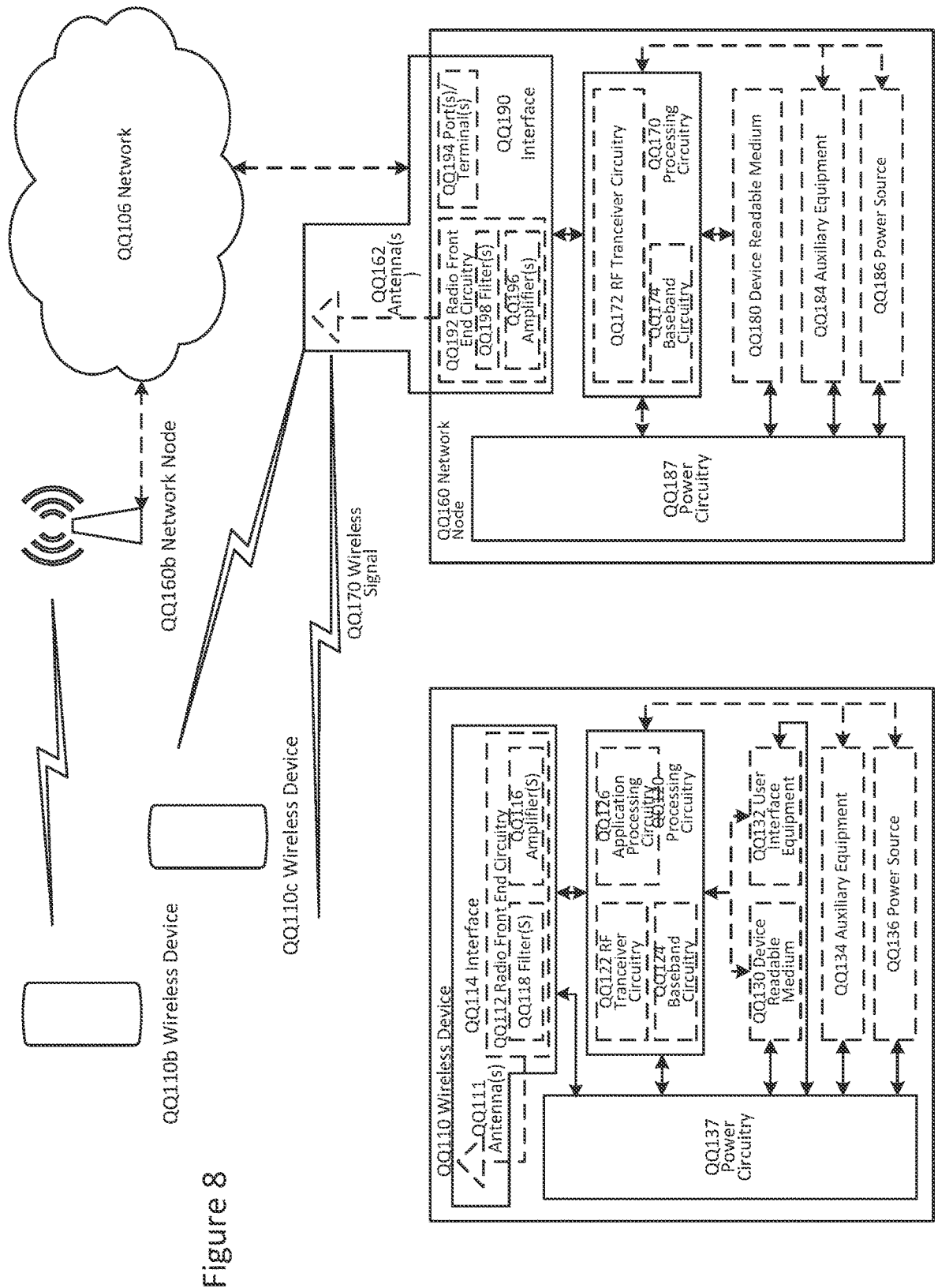
FIG. 8 is a block diagram of a wireless network in accordance with some embodiments.

FIG. 8: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
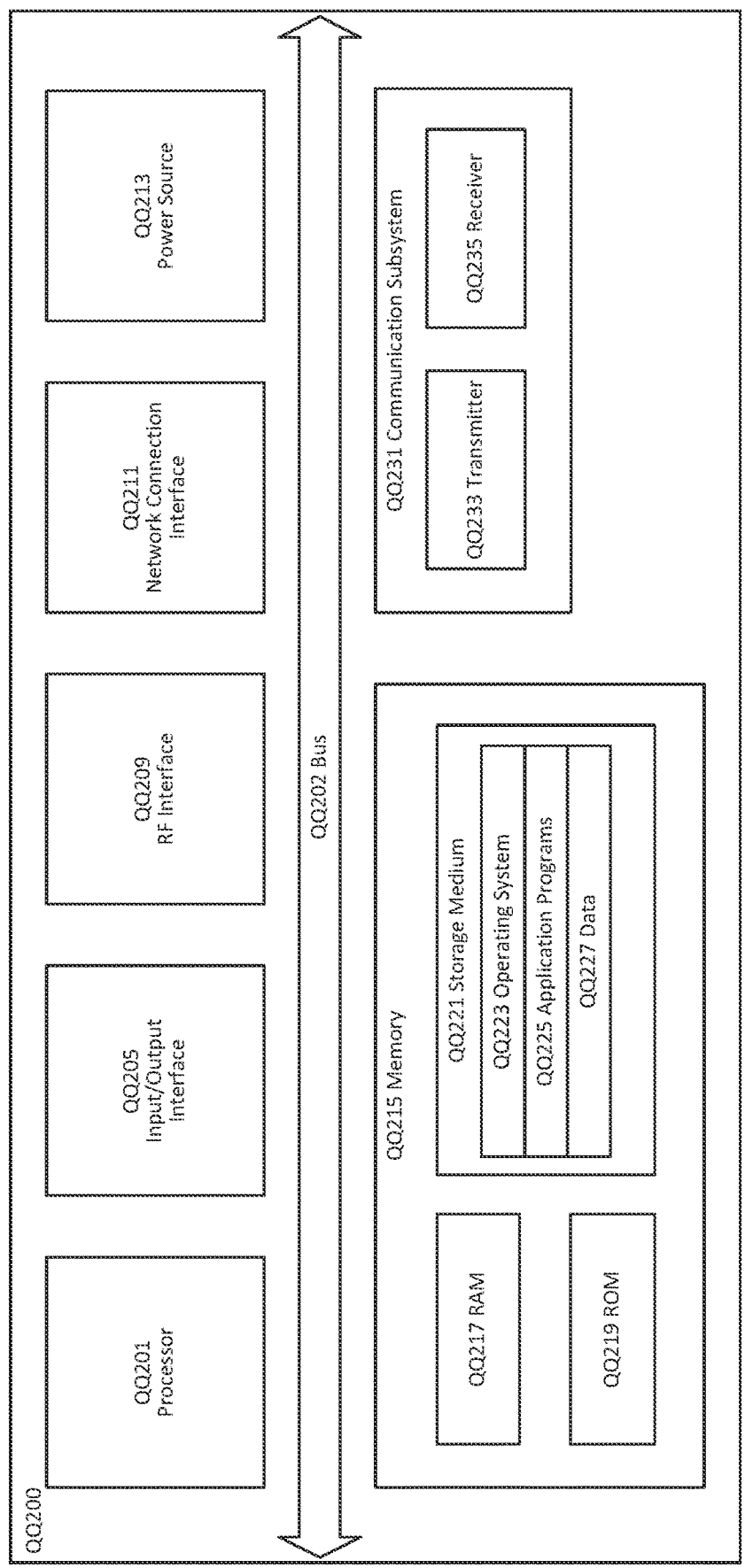
FIG. 9 is a block diagram of a user equipment in accordance with some embodiments

FIG. 9: User Equipment in accordance with some embodiments

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
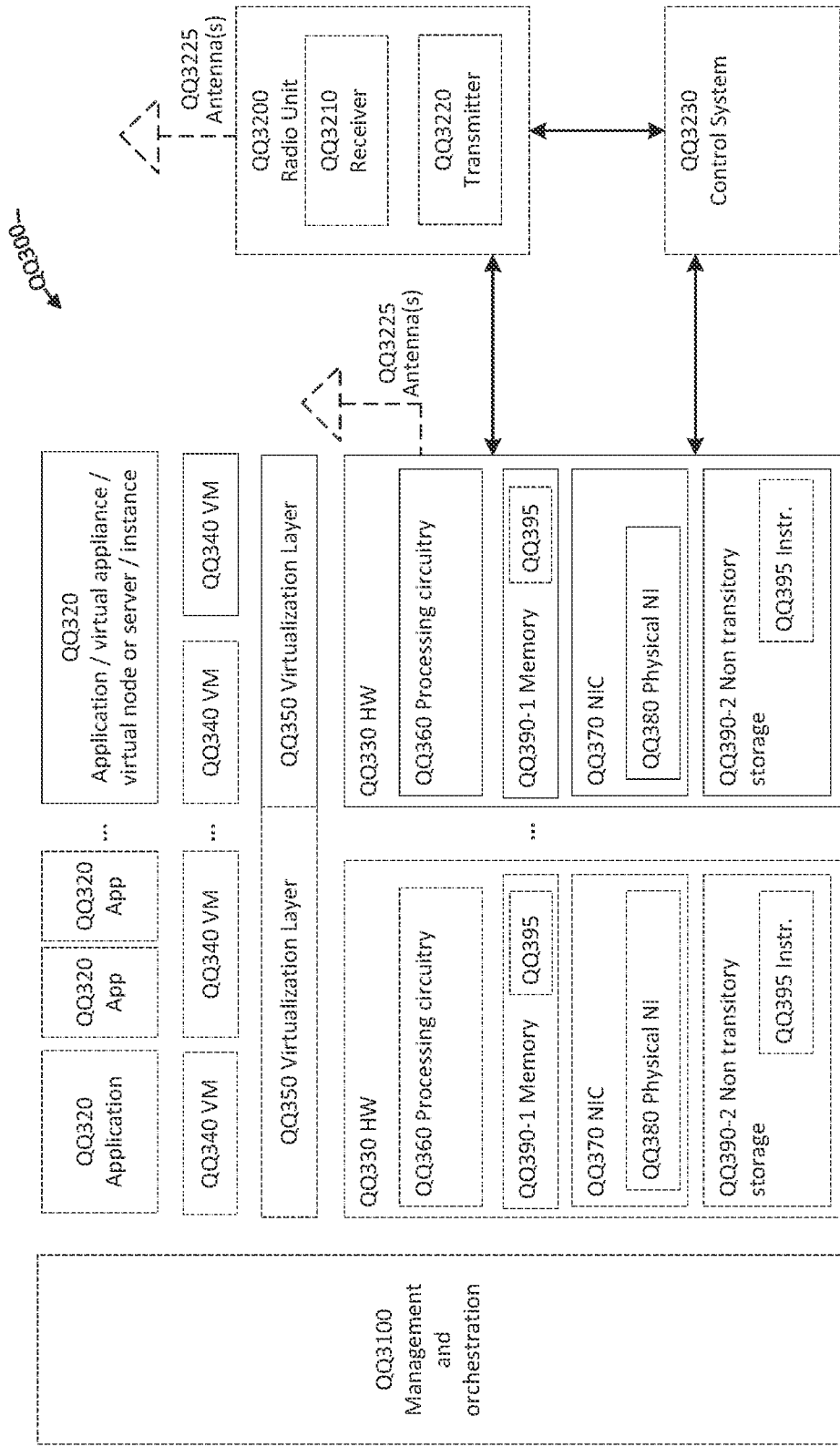
FIG. 10 is a block diagram of a virtualization environment in accordance with some embodiments.

FIG. 10: Virtualization environment in accordance with some embodiments

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
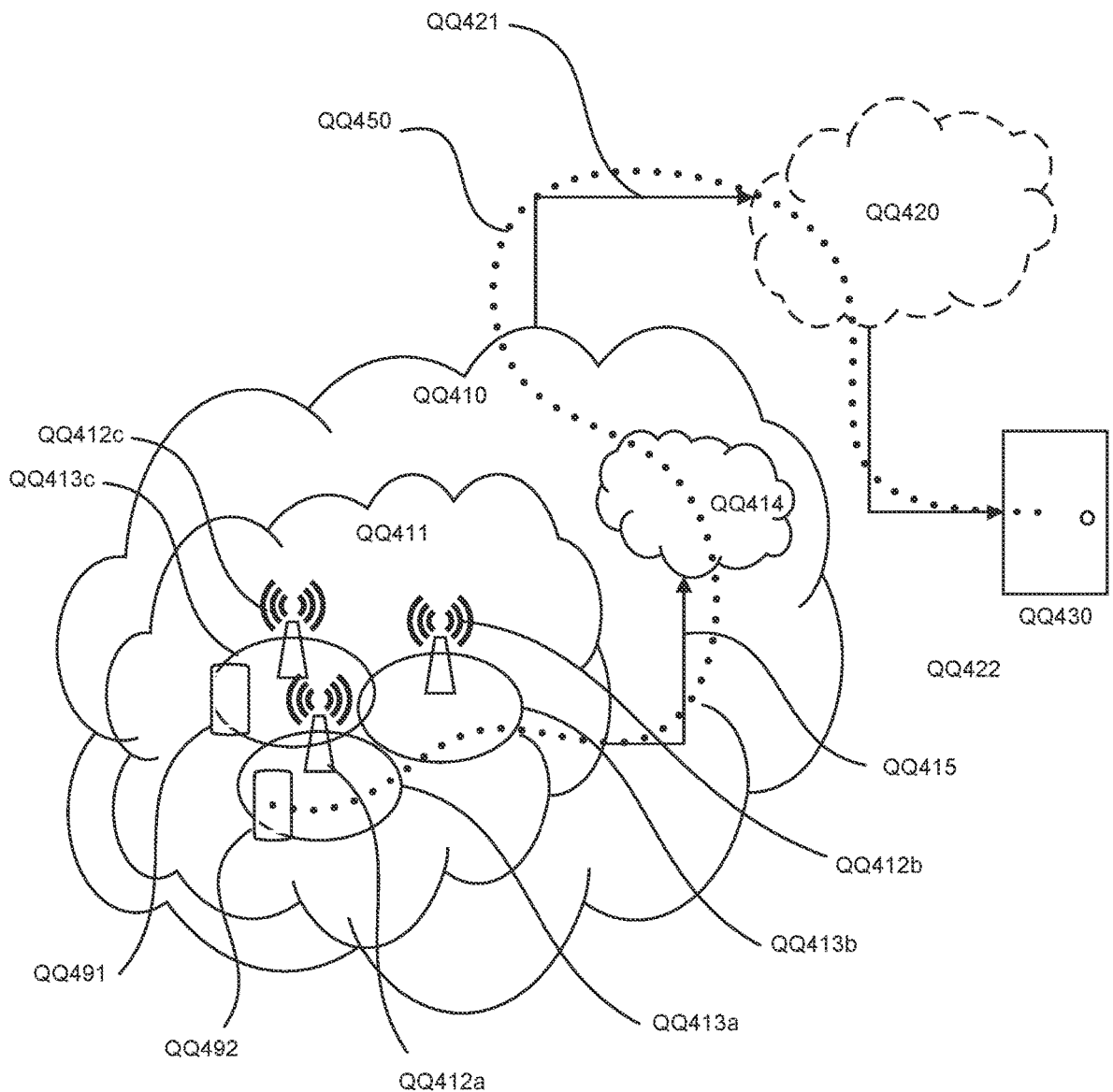
FIG. 11 is a block diagram of a telecommunication network connected via an intermediate network to a host computer in accordance with some embodiments.

FIG. 11: Telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 12:
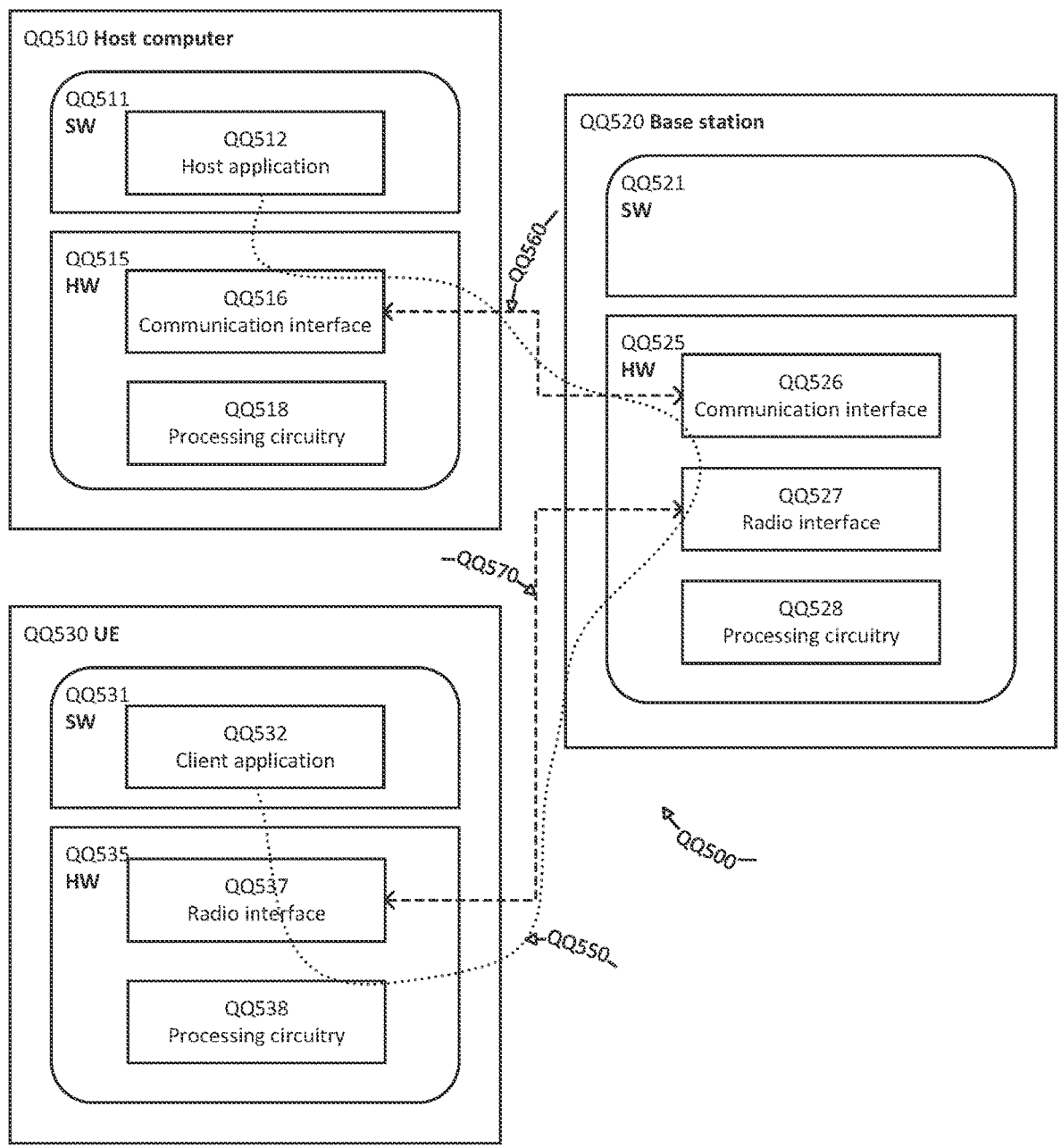
FIG. 12 is a block diagram of a host computer communicating via a base station with a user equipment over a partially wireless connection in accordance with some embodiments.

FIG. 12: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
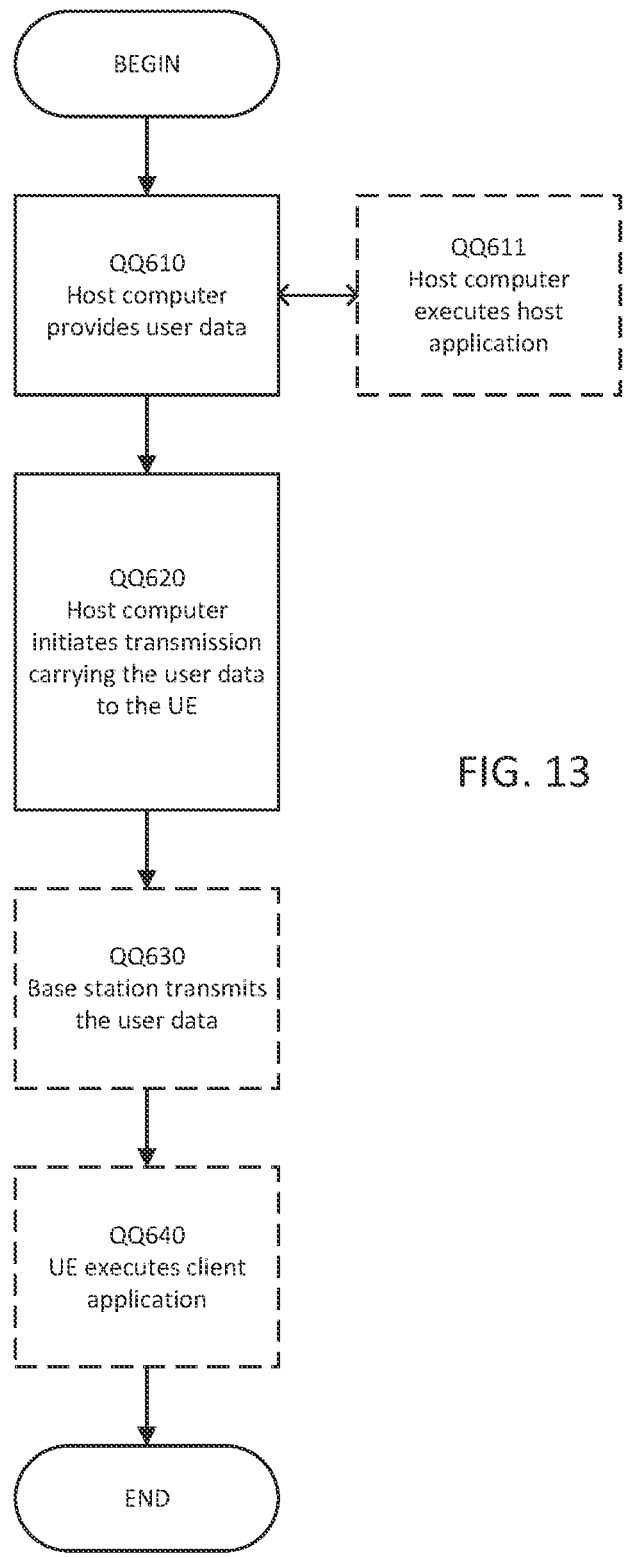
FIG. 13 is a block diagram of methods implemented in a communication system including a host computer, a base station and a user equipment in accordance with some embodiments.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
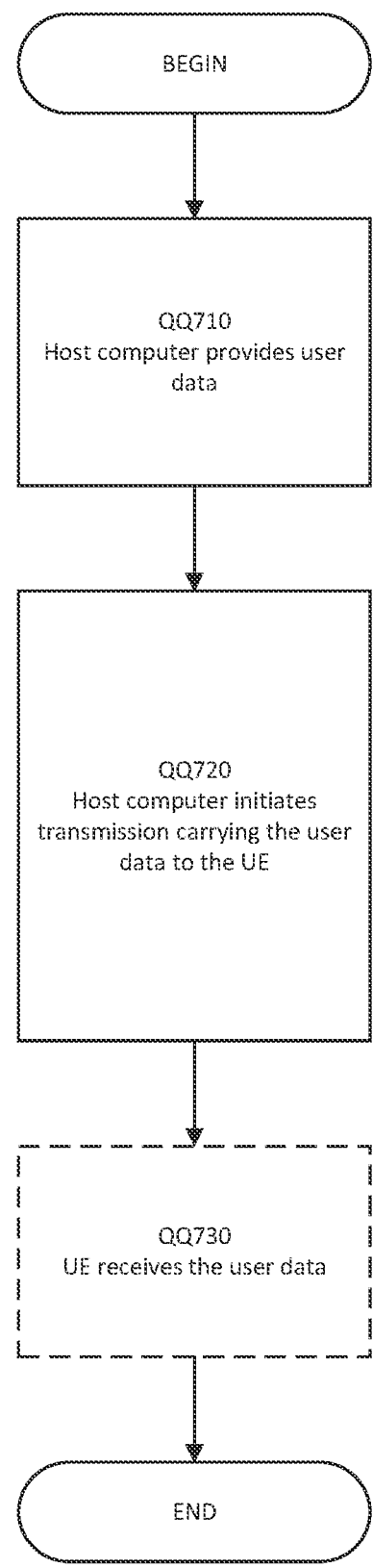
FIG. 14 is a block diagram of methods implemented in a communication system including a host computer, a base station and a user equipment in accordance with some embodiments.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
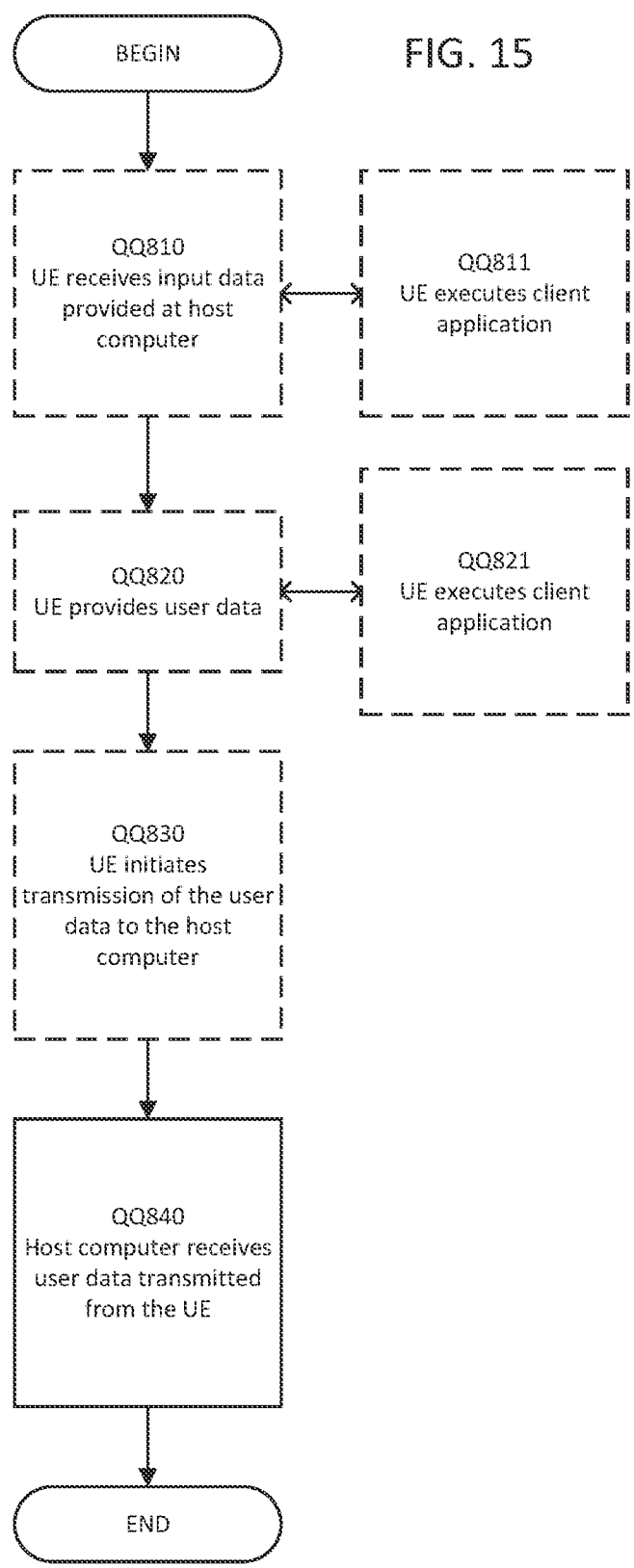
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
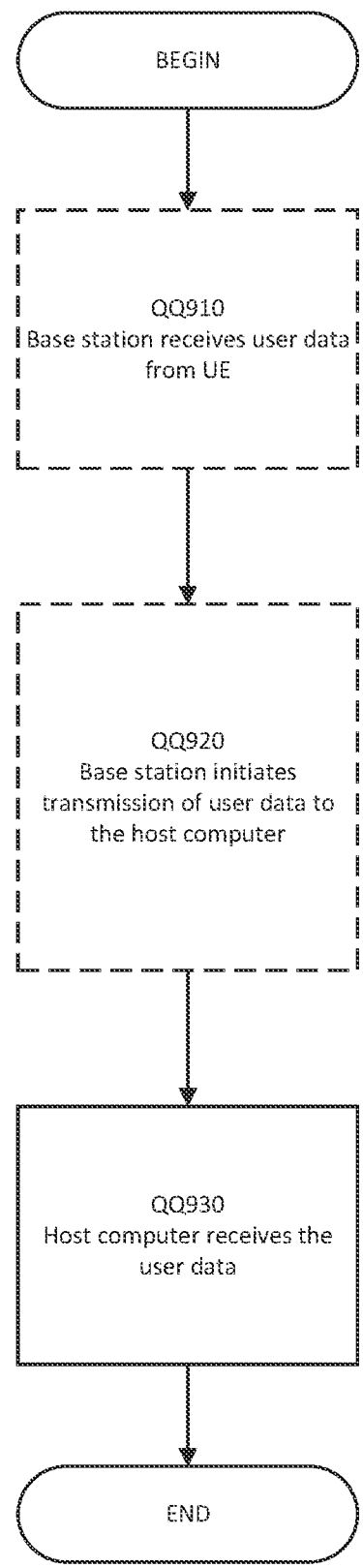
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a Session Management Function (SMF) node of a wireless communication network, the method comprising:
receiving a request to create a session for a wireless device (UE);
transmitting a communication establishment request to a Network Exposure Function (NEF) node responsive to receiving the request to create the session for the wireless device, wherein the communication establishment request includes User Plane Function (UPF) node information for a tunnel between a UPF node and the NEF node to be used for the session for the wireless device;
receiving a communication establishment response from the NEF node, wherein the communication establishment response includes NEF node information for the tunnel between the UPF node and the NEF node to be used for the session for the wireless device; and
transmitting a tunnel information update to the UPF node after receiving the communication establishment response, wherein the tunnel information update includes the NEF node information for the tunnel between the UPF node and the NEF node.

2. The method of claim 1 further comprising:
obtaining subscription information for the wireless device responsive to receiving the request to create the session for the wireless device, wherein the subscription information for the wireless device includes NEF information associated with the wireless device;
wherein transmitting the communication establishment request comprises transmitting the communication establishment request to the NEF node based on the NEF information associated with the wireless device; and at least one of:

1) wherein the NEF information associated with the wireless device includes a NEF identifier of a NEF node associated with the wireless device; or
2) wherein obtaining the subscription information comprises transmitting a request for the subscription information to a Unified Data Management, UDM, node, and receiving the subscription information from the UDM node.

3. The method of claim 2 further comprising:
selecting a User Plane Function, UPF, node for the session for the wireless device responsive to receiving the request to create the session; and
wherein selecting the UPF node includes obtaining the UPF node information for the tunnel between the UPF node and the NEF node that is included in the communication establishment request.

4. The method of claim 3, wherein the tunnel between the UPF node and the NEF node is a first tunnel, and wherein selecting the UPF node includes obtaining UPF node information for a second tunnel between the UPF node and a radio access node, RAN, associated with the wireless device, and wherein the second tunnel is to be used for the session for the wireless device, the method further comprising:
transmitting a tunnel setup request to the RAN, wherein the tunnel setup request includes the UPF node information for the second tunnel between the UPF node and the RAN; and
receiving a session establishment accept message from the RAN, wherein the session establishment accept message includes RAN information for the second tunnel between the UPF node and the RAN;
wherein the tunnel information update includes the RAN information for the second tunnel and the NEF node information for the first tunnel so that that the RAN information for the second tunnel and the NEF node information for the first tunnel are transmitted in a single message.

5. A method of operating a Network Exposure Function, NEF, node of a wireless communication network, the method comprising:
providing configuration information to a unified data management (UDM) node, wherein the configuration information includes an identification of a wireless device (UE) associated with the NEF node;
receiving a communication establishment request from a Session Management Function, SMF, node after providing the configuration information, wherein the communication establishment request includes User Plane Function (UPF) node information for a tunnel between a UPF node and the NEF node to be used for a session for the wireless device;
transmitting a communication establishment response to the SMF node, wherein the communication establishment response includes NEF node information for the tunnel between the UPF node and the NEF node to be used for the session for the wireless device;
establishing the tunnel between the NEF node and the UPF node for the session for the wireless device using the UPF node information for the tunnel; and
providing communication of data for the session for the wireless device through the tunnel.

6. The method of claim 5, wherein the UPF node information includes a UPF address and/or a UPF port number of the UPF node to be used for the tunnel; and at least one of:
1) wherein the NEF node information includes a NEF address and/or a NEF port number of the NEF node to be use for the tunnel; or
2) wherein the tunnel between the UPF node and the NEF node is a tunnel over an N6 interface between the UPF node and the NEF node; or
3) wherein the communication establishment request and/or the communication establishment response includes an identification of the wireless device.

7. A Session Management Function (SMF) node for a communication network, the SMF node comprising:
a processor; and
memory coupled with the processor, wherein the memory comprises instructions that when executed by the processor cause the processor to,
receive a request to create a session for a wireless device (UE),
transmit a communication establishment request to a Network Exposure Function (NEF) node responsive to receiving the request to create the session for the wireless device, wherein the communication establishment request includes User Plane Function (UPF) node information for a tunnel between a UPF node and the NEF node to be used for the session for the wireless device,
receive a communication establishment response from the NEF node, wherein the communication establishment response includes NEF node information for the tunnel between the UPF node and the NEF node to be used for the session for the wireless device, and
transmit a tunnel information update to the UPF node after receiving the communication establishment response, wherein the tunnel information update includes the NEF node information for the tunnel between the UPF node and the NEF node.

8. The SMF node of claim 7, wherein the memory further comprises instructions that when executed by the processor cause the processor to,
obtain subscription information for the wireless device responsive to receiving the request to create the session for the wireless device, wherein the subscription information for the wireless device includes NEF information associated with the wireless device;
wherein transmitting the communication establishment request comprises transmitting the communication establishment request to the NEF node based on the NEF information associated with the wireless device; and at least one of:
1) wherein the NEF information associated with the wireless device includes a NEF identifier of a NEF node associated with the wireless device; or
2) wherein obtaining the subscription information comprises transmitting a request for the subscription information to a Unified Data Management, UDM, node, and receiving the subscription information from the UDM node.

* * * * *

UNITED STATES PATENT AND TRADEMARK OFFICE
CERTIFICATE OF CORRECTION

PATENT NO. : 11,722,568 B2
APPLICATION NO. : 17/277937
DATED : August 8, 2023
INVENTOR(S) : Rönneke et al.

It is certified that error appears in the above-identified patent and that said Letters Patent is hereby corrected as shown below:

On the Title Page

On Page 2, item (56), under "OTHER PUBLICATIONS", in Column 2, Line 25, delete "Meeting #129" and insert -- Meeting #129; --, therefor.

In the Drawings

In Figure 4, Sheet 4 of 16, delete "retrival" and insert -- retrieval --, therefor.

In Figure 6, Sheet 6 of 16, Tag "QQ172", Line 1, delete "Tranceiver" and insert -- Transceiver --, therefor.

In Figure 6, Sheet 6 of 16, Tag "QQ174", Line 2, delete "Baseband" and insert -- Baseband Processing --, therefor.

In Figure 6, Sheet 6 of 16, Tag "QQ116", Line 2, delete "Amplifier(S)" and insert -- Amplifier(s) --, therefor.

In Figure 6, Sheet 6 of 16, Tag "QQ118", Line 1, delete "Filter(S)" and insert -- Filter(s) --, therefor.

In Figure 6, Sheet 6 of 16, Tag "QQ122", Line 2, delete "Tranceiver" and insert -- Transceiver --, therefor.

In Figure 6, Sheet 6 of 16, Tag "QQ124", Line 1, delete "Baseband" and insert -- Baseband Processing --, therefor.

In the Specification

In Column 2, Line 54, delete "embodiments" and insert -- embodiments; --, therefor.

Signed and Sealed this
Thirtieth Day of January, 2024

Katherine Kelly Vidal
*Director of the United States Patent and Trademark Office*

CERTIFICATE OF CORRECTION (continued)
U.S. Pat. No. 11,722,568 B2

In Column 10, Line 36, delete "use" and insert -- used --, therefor.

In Column 13, Line 3, delete "use" and insert -- used --, therefor.

In Column 14, Line 3, delete "use" and insert -- used --, therefor.

In Column 15, Line 12, delete "use" and insert -- used --, therefor.

In Column 15, Line 58, delete "Rout" and insert -- Route --, therefor.

In Column 16, Line 37, delete "and" and insert -- or --, therefor.

In Column 20, Line 15, delete "NodeB's." and insert -- NodeBs. --, therefor.

In Column 20, Line 57, delete "(SOC)." and insert -- (SoC). --, therefor.

In Column 21, Line 10, delete "manner" and insert -- manner. --, therefor.

In Column 25, Line 3, delete "SOC." and insert -- SoC. --, therefor.

In Column 26, Line 64, delete "embodiments" and insert -- embodiments. --, therefor.

In Column 27, Line 18, delete "interchangeable." and insert -- interchangeably. --, therefor.

In Column 29, Line 1, delete "(SIM/RUIM) module," and insert -- module (SIM/RUIM), --, therefor.

In Column 30, Line 5, delete "embodiments" and insert -- embodiments. --, therefor.

In Column 34, Line 6, delete "which it" and insert -- which --, therefor.

In Column 34, Line 43, delete "etc.; the" and insert -- etc. The --, therefor.

In Column 34, Line 48, delete "QQ510's" and insert -- QQ510 --, therefor.

In Column 36, Line 23, delete "according" and insert -- according to --, therefor.

In the Claims

In Column 38, Line 6, Claim 6, delete "use" and insert -- used --, therefor.